(12) United States Patent
Tong et al.

(10) Patent No.: US 12,386,680 B2
(45) Date of Patent: Aug. 12, 2025

(54) RESOURCE SCHEDULING BASED ON OPTIMAL PATH OF A RESOURCE LABEL FOREST

(71) Applicant: ZTE CORPORATION, Guangdong (CN)

(72) Inventors: Yao Tong, Guangdong (CN); Haixin Wang, Guangdong (CN); Xi Cheng, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 466 days.

(21) Appl. No.: 18/012,701

(22) PCT Filed: Jun. 22, 2021

(86) PCT No.: PCT/CN2021/101501
§ 371 (c)(1),
(2) Date: Dec. 23, 2022

(87) PCT Pub. No.: WO2021/259246
PCT Pub. Date: Dec. 30, 2021

(65) Prior Publication Data
US 2023/0267015 A1    Aug. 24, 2023

(30) Foreign Application Priority Data
Jun. 23, 2020  (CN) .......................... 202010584041.5

(51) Int. Cl.
*G06F 9/46*    (2006.01)
*G06F 9/50*    (2006.01)

(52) U.S. Cl.
CPC .......... *G06F 9/5094* (2013.01); *G06F 9/5088* (2013.01); *G06F 2209/501* (2013.01);
(Continued)

(58) Field of Classification Search
None
See application file for complete search history.

(56) References Cited

U.S. PATENT DOCUMENTS

2009/0113438 A1    4/2009  Barness et al.
2013/0031559 A1*   1/2013  Alicherry ............ G06F 9/5077
                                                 718/104

(Continued)

FOREIGN PATENT DOCUMENTS

CN    109039954 A    12/2018

OTHER PUBLICATIONS

European Patent Office, extended European Search Report dated Feb. 23, 2024, for corresponding EP application No. 21829551.7.
(Continued)

*Primary Examiner* — Bing Zhao
(74) *Attorney, Agent, or Firm* — Li & Cai Intellectual Property (USA) Office

(57) ABSTRACT

The present application provides a resource scheduling method and apparatus, an electronic device, and a computer readable storage medium. The method includes: selecting an optimal path from a pre-constructed resource label forest according to a weight of a path in a resource label tree in the resource label forest; and scheduling a task to a third node through which the optimal path passes. The resource label forest includes the at least one resource label tree, and each path of which includes a first node, a second node and the third node in an order from a root node to leaf nodes.

8 Claims, 4 Drawing Sheets

(52) U.S. Cl.
CPC .............. *G06F 2209/5021* (2013.01); *G06F 2209/5022* (2013.01); *G06F 2209/503* (2013.01)

(56) References Cited

U.S. PATENT DOCUMENTS

| | | |
|---|---|---|
| 2017/0085488 A1 | 3/2017 | Bhattacharya et al. |
| 2017/0230267 A1 | 8/2017 | Armolavicius et al. |
| 2018/0246916 A1* | 8/2018 | Fathalla ................. G06F 16/86 |
| 2019/0220321 A1* | 7/2019 | Yang ....................... G06F 9/505 |

OTHER PUBLICATIONS

Pateromichelakis, Samdanis, Wei, Spapis, "Slice-Tailored Joint Path Selection&Scheduling in mm-Wave Small Cell Dense Networks", 2017 IEEE Global Communication Conference dated Dec. 4, 2017.

Hadji, Aupetit Zeglache, "Cost-Efficient Algorithms for Critical Resource Allocation in Cloud Federations", 5th IEEE International Conference on Cloud Networking; Oct. 3, 2016.

\* cited by examiner

```
┌─────────────────────────────────────────────────────────────────────┐
│     select an optimal path from a pre-constructed resource label forest according to a        │
│        weight of a path in at least one resource label tree in the resource label forest, the        │   ╱ 100
│   resource label forest includes the at least one resource label tree, and each path of the at   │  ╱
│    least one resource label tree comprises a first node, a second node and a third node in   │ ╱
│         an order from a root node to leaf nodes, the first node is a node corresponding to a        │
│   physical resource corresponding to a tenant, the second node is a node corresponding to   │
│     a user belonging to the tenant, and the third node is a node corresponding to a virtual    │
│           resource which is deployed on the physical resource and managed by the user          │
└─────────────────────────────────────────────────────────────────────┘
                                        │
                                        ▼
┌─────────────────────────────────────────────────────────────────────┐    ╱ 101
│           schedule a task to the third node through which the optimal path passes           │   ╱
└─────────────────────────────────────────────────────────────────────┘
```

FIG. 1

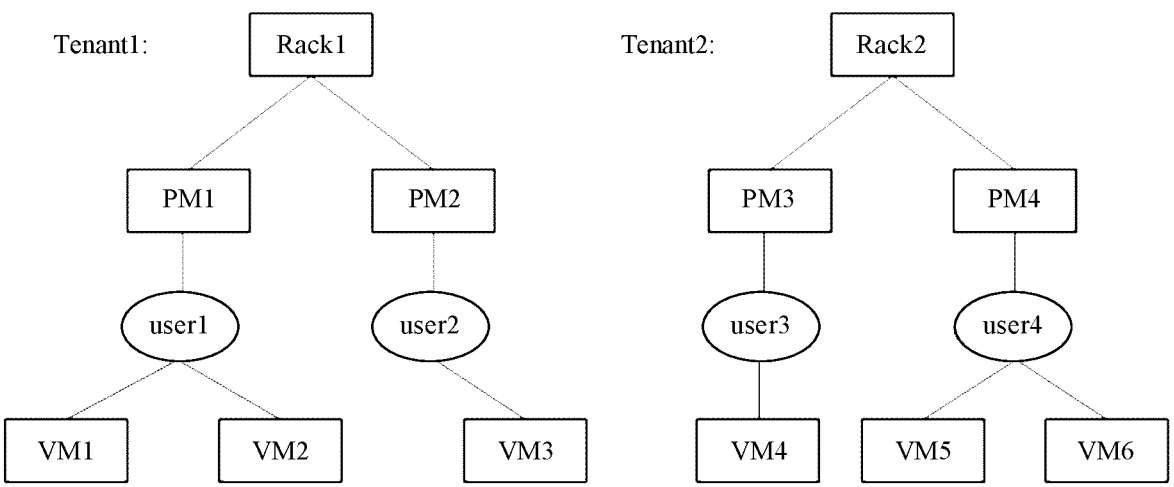

FIG. 2

RESOURCE SCHEDULING BASED ON OPTIMAL PATH OF A RESOURCE LABEL FOREST

CROSS-REFERENCE TO RELATED APPLICATION

The present disclosure is a National Phase Application filed under 35 U.S.C. 371 as a national stage of PCT/CN2021/101501, filed on Jun. 22, 2021, an application claiming the priority of Chinese Patent Application No. 202010584041.5 filed with the CNIPA on Jun. 23, 2020, the entire contents of which is incorporated herein by reference.

TECHNICAL FIELD

The embodiment of the present application relates to the technical field of computers, and in particular relates to a resource scheduling method, a resource scheduling apparatus, an electronic device, and a computer readable storage medium.

BACKGROUND

Resource scheduling is a process of allocating and temporarily transferring a resource from a resource provider to a user. An available resource in a data center can be more efficiently utilized by optimizing a resource scheduling management and dynamically reallocating the resource, thereby reducing the energy consumption. A traditional resource scheduling method cannot meet differential requirements of tenants and tasks in a multi-tenant scene, and jitter is easily generated after scheduling, which causes a secondary scheduling.

SUMMARY

An embodiment of the present application provides a resource scheduling method, including: selecting an optimal path from a pre-constructed resource label forest according to a weight of a path in at least one resource label tree in the resource label forest, wherein the resource label forest includes the at least one resource label tree, and each path of the at least one resource label tree includes a first node, a second node and a third node in an order from a root node to leaf nodes, wherein the first node is a node corresponding to a physical resource corresponding to a tenant, the second node is a node corresponding to a user belonging to the tenant, and the third node is a node corresponding to a virtual resource which is deployed on the physical resource and managed by the user; and scheduling a task to the third node through which the optimal path passes.

An embodiment of the present application provides an electronic device, including: at least one processor; and a memory having at least one program stored thereon, wherein the at least one program, when executed by the at least one processor, causes the at least one processor to implement the resource scheduling method of the present application.

An embodiment of the present application provides a computer readable storage medium, having a computer program stored thereon, wherein the computer program, when executed by a processor, causes the processor to implement the resource scheduling method of the present application.

BRIEF DESCRIPTION OF DRAWINGS

FIG. 1 is a flowchart of a resource scheduling method provided in the present application;

FIG. 2 is a schematic diagram of resource label trees in a resource label forest provided in the present application;

DETAIL DESCRIPTION OF EMBODIMENTS

Figure 3:
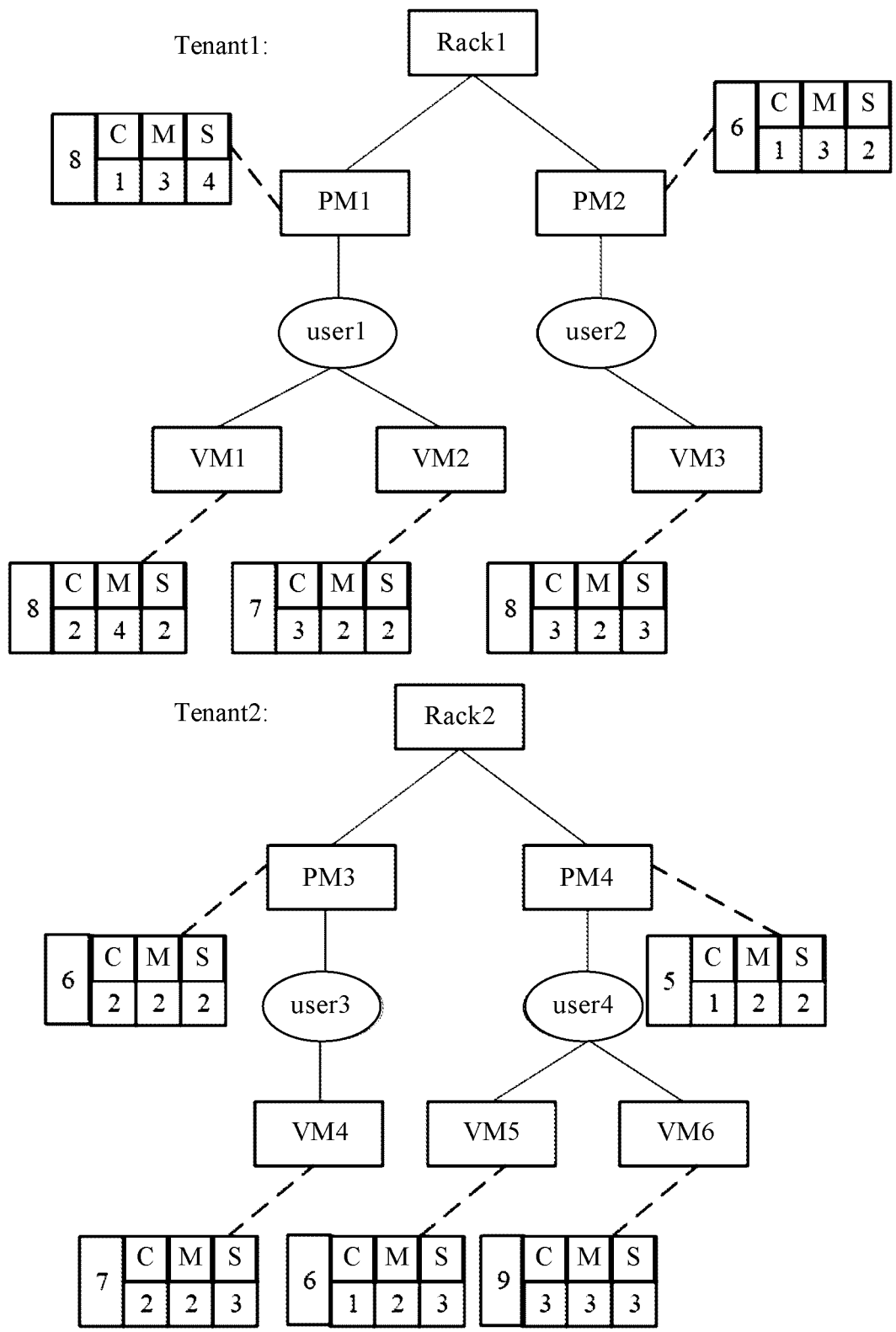
FIG. 3 is a schematic diagram of assigning corresponding weights to a first node and a third node in the present application.

In order to make one of ordinary skill in the art better understand the technical solution of the present application, a resource scheduling method, a resource scheduling apparatus, an electronic device, and a computer readable storage medium provided in the present application are described in detail below with reference to the accompanying drawings.

Example embodiments will be described more fully hereinafter with reference to the accompanying drawings, but may be embodied in different forms and should not be construed as limited to the embodiments set forth herein. Rather, these embodiments are provided so that the present application will be thorough and complete, and will fully convey a scope of the present application to one of ordinary skill in the art.

Embodiments of the present application and features in the embodiments can be combined with each other without conflict.

As used herein, a term "and/or" includes any and all combinations of at least one associated listed item.

Terms used herein are only for describing particular embodiments and are not intended to limit the present application. As used herein, singular forms "a", "an" and "the" are intended to include the plural forms as well, unless the context clearly indicates otherwise. It will be further understood that terms "comprises" and/or "includes", when used in this specification, specify the presence of stated features, integers, steps, operations, elements, and/or components, but do not preclude the presence or addition of at least one of other features, integers, steps, operations, elements, components, and/or a group thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the related art and the context of the present application, and will not be interpreted in an idealized or overly formal sense, unless expressly so defined herein.

FIG. 1 is a flowchart of a resource scheduling method provided in the present application.

Referring to FIG. 1, the resource scheduling method provided by the present application includes operations 100 to 101.

In operation 100, an optimal path is selected from a pre-constructed resource label forest according to a weight of a path in at least one resource label tree in the resource label forest, wherein the resource label forest includes the at least one resource label tree, and each path of the at least one resource label tree includes a first node, a second node and a third node in an order from a root node to leaf nodes, wherein the first node is a node corresponding to a physical resource corresponding to a tenant, the second node is a node corresponding to a user belonging to the tenant, and the third node is a node corresponding to a virtual resource which is deployed on the physical resource and managed by the user.

In operation 101, a task is scheduled to the third node through which the optimal path passes.

In order to meet the differential requirements of the tasks, an unscheduled task with the highest priority may be scheduled to the third node through which the optimal path passes. A priority of a task may be determined according to the importance of the task.

Before the operation of selecting the optimal path from the pre-constructed resource label forest according to the weight of the path in the at least one resource label tree in the resource label forest (i.e., the operation 100), the method may further include: constructing the resource label forest according to a relationship among the tenants, the physical resources, the users and the virtual resources; and assigning corresponding weights to each first node and each third node in each resource label tree in the resource label forest, respectively.

According to the resource scheduling method provided by the present application, the resource scheduling is achieved based on the pre-constructed resource label forest, and different tenants correspond to different physical resources, users and virtual resources, and the resource label forest represents the relationship among the tenants, the physical resources, the users and the virtual resources (that is, which physical resources correspond to the tenants, which users are included under the tenants, and which virtual resources deployed on the physical resources are managed by the users included under the tenants), so that the differential requirements of the tenants are met in a multi-tenant scene, and a rationality of the resource scheduling is improved.

It should be noted that each path in the resource label tree represents the relationship among the tenants, the physical resources, the users and the virtual resources, where the relationship refers to: which physical resources and which virtual resources correspond to the tenants, that is, which physical resources and which virtual resources belong to the tenants; which users are included by the tenants, that is, which users belong to the tenants; which virtual resources are deployed on the physical resources; and which virtual resources are managed by corresponding users.

The first node may be represented by nodes having hierarchical structures according to a hierarchical distribution of the physical resources. For example, as shown in FIG. 2, the physical resources have two hierarchical structures, that is, a rack and a physical machine (PM), wherein the physical machine belongs to the rack. Therefore, two first nodes in two hierarchies may be provided, a first node in a first hierarchy is a node corresponding to the rack, and a first node in a second hierarchy is a node corresponding to the physical machine. A physical resource may refer to a rack, a physical machine, etc., and a virtual resource may refer to a virtual machine (VM), etc.

For example, as shown in FIG. 2, the resource label forest includes 2 resource label trees, which are a resource label tree 1 and a resource label tree 2, respectively. The resource label tree 1 corresponds to a tenant 1, and the resource label tree 2 corresponds to a tenant 2.

Physical resources of the tenant 1 include a rack 1, a physical machine 1, and a physical machine 2. A virtual machine 1 and a virtual machine 2 are deployed on the physical machine 1, and a virtual machine 3 is deployed on the physical machine 2. The tenant 1 includes a user 1 and a user 2. The user 1 manages the virtual machine 1 and the virtual machine 2, and the user 2 manages the virtual machine 3.

Physical resources of the tenant 2 include a rack 2, a physical machine 3, and a physical machine 4. A virtual machine 4 is deployed on the physical machine 3, and a virtual machine 5 and a virtual machine 6 are deployed on the physical machine 4. The tenant 2 includes a user 3 and a user 4. The user 3 manages the virtual machine 4, and the user 4 manages the virtual machine 5 and the virtual machine 6.

A root node of the resource label tree 1 is a node corresponding to the rack 1, and leaf nodes of the resource label tree 1 include a node corresponding to the virtual machine 1, a node corresponding to the virtual machine 2, and a node corresponding to the virtual machine 3. The first nodes include a node corresponding to the rack 1, a node corresponding to the physical machine 1, and a node corresponding to the physical machine 2. The second nodes include a node corresponding to the user 1 and a node corresponding to the user 2. The third nodes include the node corresponding to the virtual machine 1, the node corresponding to the virtual machine 2, and the node corresponding to the virtual machine 3.

A root node of the resource label tree 2 is a node corresponding to the rack 2, and leaf nodes of the resource label tree 2 include a node corresponding to the virtual machine 4, a node corresponding to the virtual machine 5, and a node corresponding to the virtual machine 6. The first nodes include a node corresponding to the rack 2, a node corresponding to the physical machine 3, and a node corresponding to the physical machine 4. The second nodes include a node corresponding to the user 3 and a node corresponding to the user 4. The third nodes include the node corresponding to the virtual machine 4, the node corresponding to the virtual machine 5, and the node corresponding to the virtual machine 6.

A weight of a path may be determined according to weights of the first nodes and the third nodes through which the path passes. For example, the weight of the path may be a sum of the weights of the first node and the third node through which the path passes. Alternatively, the weight of the path may be a weighted average of the weights of the first node and the third node through which the path passes. Obviously, the weight of the path may also be calculated in other ways, which are not used to limit the protection scope of the embodiment of the present application.

It should be noted that when there is a relationship among multiple layers of nodes corresponding to the physical resource, the weight of the first node refers to the weight of the node in the lowest layer. For example, in FIG. 2, the node corresponding to the physical machine 1 and the node corresponding to the physical machine 2 are in a next layer of the node corresponding to the rack 1. In this case, the weight of the first node refers to the weight of the node corresponding to the physical machine 1 and the weight of the node corresponding to the physical machine 2.

For example, as shown in FIG. 2, the weight of the path including the node corresponding to the rack 1, the node corresponding to the physical machine 1, the node corresponding to the user 1, and the node corresponding to the virtual machine 1 is the sum of the weight of the node corresponding to the physical machine 1 and the weight of the node corresponding to the virtual machine 1, and the weights of other paths can be calculated in the same manner.

The weight of the first node may be determined according to a CPU utilization, a memory utilization, and a storage utilization of the first node in a specified time period, and the weight of the third node may be determined according to a CPU utilization, a memory utilization, and a storage utilization of the third node in the specified time period.

For example, the weight of the first node may be a sum of the CPU utilization, the memory utilization, and the storage utilization of the first node in the specified time period, and the weight of the third node may be a sum of the CPU utilization, the memory utilization, and the storage utilization of the third node in the specified time period.

For another example, the weight of the first node may be a weighted average of the CPU utilization, the memory utilization, and the storage utilization of the first node in the specified time period, and the weight of the third node may be a weighted average of the CPU utilization, the memory utilization, and the storage utilization of the third node in the specified time period.

For another example, the weight of the first node may be a sum of a first score corresponding to the CPU utilization, a second score corresponding to the memory utilization, and a third score corresponding to the storage utilization of the first node in the specified time period, and the weight of the third node may be a sum of a first score corresponding to the CPU utilization, a second score corresponding to the memory utilization, and a third score corresponding to the storage utilization of the third node in the specified time period.

For another example, the weight of the first node may be a weighted average of the first score corresponding to the CPU utilization, the second score corresponding to the memory utilization, and the third score corresponding to the storage utilization of the first node in the specified time period, and the weight of the third node may be a weighted average of the first score corresponding to the CPU utilization, the second score corresponding to the memory utilization, and the third score corresponding to the storage utilization of the third node in the specified time period.

Obviously, the weight of the first node and the weight of the third node may also be calculated in other ways, which are not used to limit the protection scope of the embodiment of the present application.

For example, if the CPU utilization is between 0% and 20%, the first score is 1; if the CPU utilization is between 20% and 40%, the first score is 2; if the CPU utilization is between 40% and 60%, the first score is 3; if the CPU utilization is between 60% and 80%, the first score is 4; if the CPU utilization is between 80% and 100%, the first score is 5. Obviously, the CPU utilization may correspond to the first score in other ways, which are not used to limit the protection scope of the embodiment of the present application.

For example, if the memory utilization is between 0% and 20%, the second score is 1; if the memory utilization is between 20% and 40%, the second score is 2; if the memory utilization is between 40% and 60%, the second score is 3; if the memory utilization is between 60% and 80%, the second score is 4; if the memory utilization is between 80% and 100%, the second score is 5. Obviously, the memory utilization may correspond to the second score in other ways, which are not used to limit the protection scope of the embodiment of the present application.

For example, if the storage utilization is between 0% and 20%, the third score is 1; if the storage utilization is between 20% and 40%, the third score is 2; if the storage utilization is between 40% and 60%, the third score is 3; if the storage utilization is between 60% and 80%, the third score is 4; if the storage utilization is between 80% and 100%, the third score is 5. Obviously, the storage utilization may correspond to the third score in other ways, which are not used to limit the protection scope of the embodiment of the present application.

For example, as shown in FIG. 3, if for the node corresponding to the physical machine 1, in a specified time period, the first score corresponding to the CPU utilization (C) is 1, the second score corresponding to the memory utilization (M) is 3, and the third score corresponding to the storage utilization (S) is 4, a weight of the node corresponding to the physical machine 1 is 8; and the weights of other nodes can be calculated in the same manner, which will not be described in detail here.

The operation of selecting the optimal path from the pre-constructed resource label forest according to the weight of the path in the at least one resource label tree in the resource label forest (i.e., the operation 100) may include: traversing each path in each resource label tree in the resource label forest, and selecting a path with the minimum weight as the optimal path, where a weight of the path is determined according to a resource utilization of the node through which the path passes.

Figure 4:
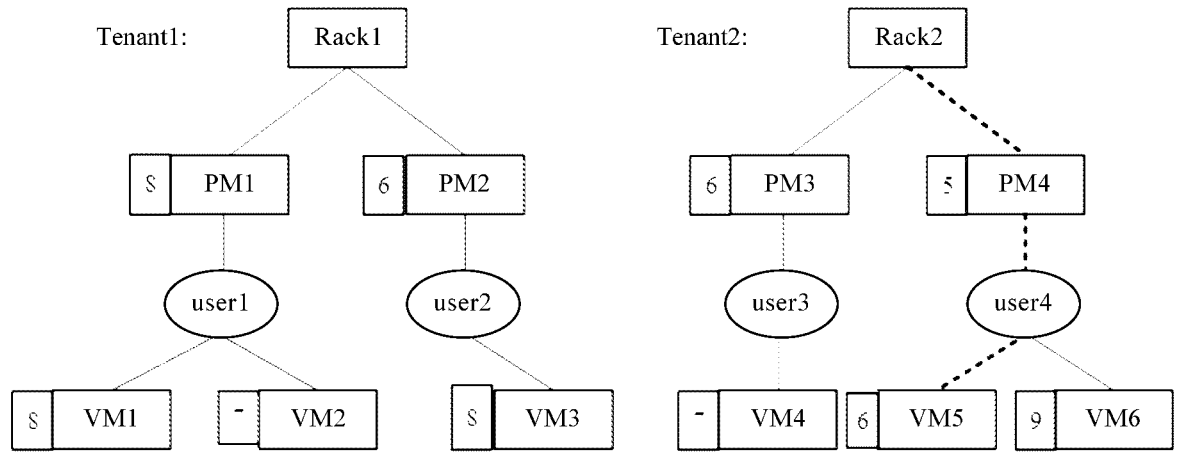
FIG. 4 is a schematic diagram of selecting an optimal path according to the present application.

For example, as shown in FIG. 4, a weight of a path, shown by dotted lines and including the node corresponding to the rack 2, the node corresponding to the physical machine 4, the node corresponding to the user 4, and the node corresponding to the virtual machine 5, is: 5+6=11, and the path is the path with the minimum weight among all paths, thus the task may be scheduled to the path.

Obviously, the optimal path may be selected in other ways, which are not used to limit the protection scope of the embodiment of the present application. It is emphasized in the present application that the resource scheduling method is implemented based on the resource label forest, which represents the relationship among the tenants, the physical resources, the users and the virtual resources; and the resource scheduling is implemented based on the differentiation for the tenants.

According to the resource scheduling method of the present application, the weight of the path is determined based on the resource utilization of the node through which the path passes, and the path with the minimum weight is selected as the optimal path. The path with the minimum weight means that the node through which the path passes has the minimum resource utilization. The path with the minimum weight is selected as the optimal path, and then the task is scheduled to the third node through which the optimal path passes, thereby improving the utilization of resources.

In practical applications, the following situations may exist: the resource utilization of the physical resource is relatively high, but the resource utilization of the virtual resource of the physical resource is relatively low. In this case, during the process of the resource scheduling, a secondary scheduling may be caused since the physical resource cannot meet the operation requirement. In order to avoid the secondary scheduling, the resource scheduling method of the present application may further include: migrating a target user and a virtual resource managed by the target user on a physical resource corresponding to a first node with at least one of the CPU utilization, the memory utilization and the storage utilization greater than a preset threshold to a physical resource corresponding to a first node with the minimum weight; and reconstructing the resource label forest according to a relationship among the migrated tenants, the physical resources, the users and the virtual resources, wherein the target user is a user with the maximum weight or a user with the second maximum weight.

The preset threshold may be selected according to actual situations. For example, the preset threshold is selected to be 80%. That is, at least one of the CPU utilization, the memory utilization, and the storage utilization exceeds 80%.

The user with the maximum weight may be preferentially selected as the target user. If the physical resource corresponding to the first node with the minimum weight is not enough to support the virtual resource managed by the user with the maximum weight, the user with the second maximum weight may be selected as the target user.

The weight of the user may be determined according to the weight of the node corresponding to the virtual resource managed by the user.

For example, the weight of the user may be a sum of the weights of the nodes corresponding to the virtual resources managed by the user. Alternatively, the weight of the user may be a weighted average of the weights of the nodes corresponding to the virtual resources managed by the user. Obviously, the weight of the user may also be calculated in other ways, which are not used to limit the protection scope of the embodiment of the present application.

According to the resource scheduling method of the present application, when the weight of the first node is greater than the preset threshold, the target user on the physical resource corresponding to the first node and the virtual resource managed by the target user are migrated to the physical resource corresponding to the first node with the minimum weight, so that the resource utilization of the first node with the weight greater than the preset threshold is reduced, the resource utilizations of different first nodes are more balanced, and thus, during the process of the resource scheduling, the secondary scheduling may not be caused since the physical resource cannot meet the operation requirement, thus the secondary scheduling for the resource is reduced or avoided.

In practical applications, the following situations may also exist: the resource utilization of the physical resource is not high, the resource utilization of the virtual resource on the physical resource is not high, but a load of the virtual resource has a tide characteristic, in which a tide phenomenon occurs at a certain specific time point, that is, the resource utilization of the virtual resource may be relatively high. When the tide phenomenon occurs, the virtual resource may possibly fail to meet the operation requirement, which causes a secondary scheduling for the resource. In order to avoid the secondary scheduling, the resource scheduling method of the present application may further include: before the virtual resource with the tide characteristic generates a tide phenomenon, cloning a virtual resource which is the same as the virtual resource with the tide characteristic on a physical resource where the virtual resource with the tide characteristic is located, wherein a communication address of the cloned virtual resource is different from that of the virtual resource with the tide characteristic, and the cloned virtual resource and the virtual resource with the tide characteristic share a task; and reclaiming the cloned virtual resource after the tide phenomenon in the virtual resource with the tide characteristic ends.

The communication address may include at least one of: Internet Protocol (IP) address, Media Access Control (MAC) address.

A time period during which the virtual resource generates the tide phenomenon may be obtained through an analysis for a historical operation and maintenance data, and a peak of the physical resource required by the virtual resource in a tide scene is calculated.

According to the resource scheduling method of the present application, for the virtual resource with the tide characteristic, a same virtual resource is cloned before the tide phenomenon occurs, and the cloned virtual resource and the original virtual resource share the task scheduled to the virtual resource with the tide characteristic, so that a secondary scheduling caused by the fact that the virtual resource cannot meet the operation requirement when the tide phenomenon occurs is avoided. That is, the secondary scheduling for the resource is avoided. After the tide phenomenon ends, the cloned virtual resource is reclaimed, so that the waste of the resource utilization is avoided.

The present application provides an electronic device, including: at least one processor; and a memory having at least one program stored thereon, wherein the at least one program, when executed by the at least one processor, causes the at least one processor to implement the resource scheduling method according to any one of embodiments of the present application.

The processor is a device with a data processing capability, and includes, but is not limited to, Central Processing Unit (CPU), etc. The memory is a device with a data storage capability, and includes, but is not limited to, Random Access Memory (RAM, more specifically, such as SDRAM, DDR, etc.), Read Only Memory (ROM), Electrically Erasable Programmable Read Only Memory (EEPROM), FLASH.

The processor and the memory may be interconnected via a bus and thus be connected to other components of the electronic device.

The present application provides a computer readable storage medium having a computer program stored thereon, wherein the computer, when executed by a processor, causes the processor to implement the resource scheduling method according to any one of embodiments of the present application.

Figure 5:
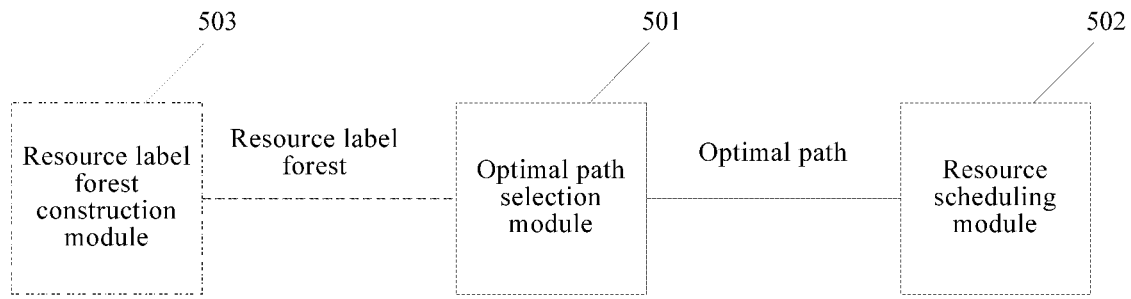
FIG. 5 is a block diagram illustrating a resource scheduling apparatus provided in the present application.

FIG. 5 is a block diagram illustrating a resource scheduling apparatus provided in the present application.

Referring to FIG. 5, the resource scheduling apparatus provided in the present application includes an optimal path selection module 501 and a resource scheduling module 502.

The optimal path selection module 501 is configured to select an optimal path from a pre-constructed resource label forest according to a weight of a path in at least one resource label tree in the resource label forest, wherein the resource label forest includes the at least one resource label tree, and each path of the at least one resource label tree includes a first node, a second node and a third node in an order from a root node to leaf nodes, wherein the first node is a node corresponding to a physical resource corresponding to a tenant, the second node is a node corresponding to a user belonging to the tenant, and the third node is a node corresponding to a virtual resource which is deployed on the physical resource and managed by the user.

The resource scheduling module 502 is configured to schedule the task to the third node through which the optimal path passes.

The optimal path selection module 501 may be configured to: traverse each path in each resource label tree in the resource label forest, and select a path with the minimum weight as the optimal path, where a weight of the path is determined according to a resource utilization of the node through which the path passes.

The weight of the path may be determined according to the weights of the first node and the third node through which the path passes.

The weight of the first node may be determined according to a CPU utilization, a memory utilization, and a storage utilization of the first node in a specified time period, and the weight of the third node may be determined according to a CPU utilization, a memory utilization, and a storage utilization of the third node in the specified time period.

The resource scheduling apparatus may further include a resource label forest construction module 503 configured to migrate a target user and a virtual resource managed by the target user on a physical resource corresponding to a first node with at least one of the CPU utilization, the memory utilization and the storage utilization greater than a preset threshold to a physical resource corresponding to a first node with the minimum weight; and reconstruct the resource label forest according to a relationship among the migrated tenants, the physical resources, the users and the virtual resources, wherein the target user is a user with the maximum weight or a user with the second maximum weight.

A weight of the user may be determined according to the weight of the node corresponding to the virtual resource managed by the user.

The resource label forest construction module 503 may also be configured to clone a virtual resource which is the same as a virtual resource with a tide characteristic on a physical resource where the virtual resource with the tide characteristic is located before the virtual resource with the tide characteristic generates a tide phenomenon, wherein a communication address of the cloned virtual resource is different from that of the virtual resource with the tide characteristic, and the cloned virtual resource and the virtual resource with the tide characteristic share a task; and the resource label forest construction module 503 may also be configured to reclaim the cloned virtual resource after the tide phenomenon in the virtual resource with the tide characteristic ends.

The resource label forest construction module 503 may be further configured to construct the resource label forest according to a relationship among the tenants, the physical resources, the users and the virtual resources; and assign corresponding weights to each first node and each third node in each resource label tree in the resource label forest, respectively.

Figure 6:
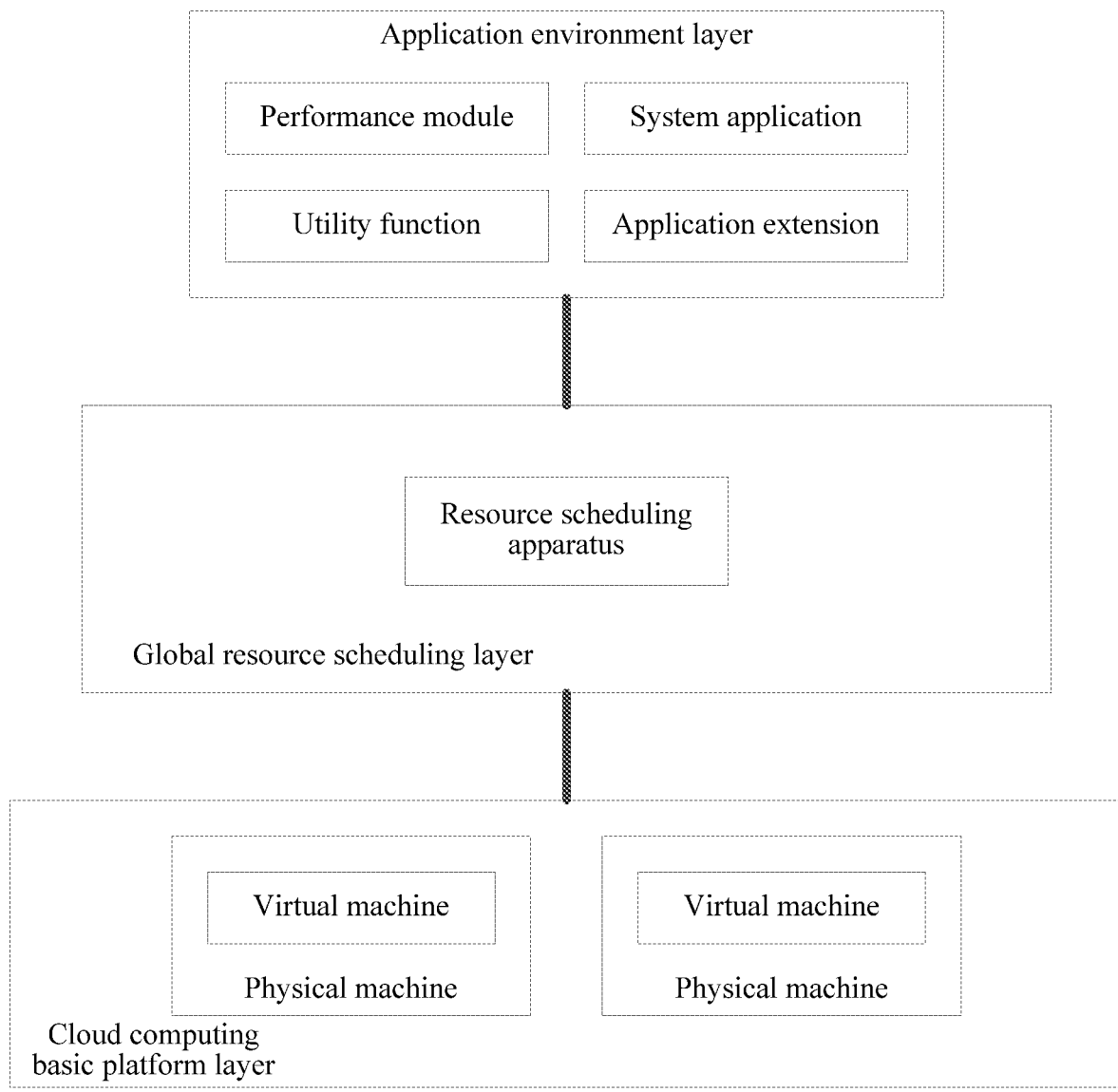
FIG. 6 is a schematic diagram illustrating an application of the resource scheduling apparatus provided in the present application.

FIG. 6 is a schematic diagram illustrating an application of the resource scheduling apparatus provided in the present application.

As shown in FIG. 6, a system is divided into three layers, that is, a cloud computing basic platform layer, a global resource scheduling layer and an application environment layer. The bottom layer is a cloud computing basic platform layer and includes: a physical machine and a virtual machine on the physical machine. The global resource scheduling layer includes the resource scheduling apparatus according to the present application. The application environment layer includes: a performance module, a system application, a utility function, and an application extension.

The performance module is configured to monitor a system performance indicator, such as Input Output Operations Per Second (TOPS), ConCurrent Connections, or the like.

The system application refers to an application of the system in a global level, such as a network management application.

The utility function refers to a function that evaluates and scores a usage of the application as a whole.

The application extension is to provide components for caching, load balancing or the like, for use by the application.

When the resource is scheduled, firstly, the resource label forest construction module labels resource nodes and user nodes under all tenants, calculates weights for all the resource nodes; then, the optimal path selection module traverses all resource label forests to find a path with the minimum weight; the resource scheduling module schedules a task to a corresponding physical machine and a virtual machine on the path with the minimum weight; and finally, the resource label forest construction module evaluates the resource label forest as a whole. If a resource node of a physical machine with at least one of the CPU utilization, the memory utilization and the storage utilization greater than 80% or a virtual machine with the tide characteristic is found, the scheduling is performed according to a preset rule.

It will be understood by one of ordinary skill in the art that all or some of the steps of the method, functional modules/units in the system and device disclosed above may be implemented as software, firmware, hardware, or suitable combinations thereof. In a hardware implementation, a division for functional modules/units mentioned in the above description does not necessarily correspond to a division for physical components. For example, one physical component may have multiple functions, or one function or step may be performed by several physical components in cooperation. Some or all of the physical components may be implemented as software executed by a processor, such as a central processing unit, a digital signal processor, or a microprocessor; or as hardware; or as an integrated circuit, such as an application specific integrated circuit. Such software may be distributed on computer readable media, which may include computer storage media (or non-transitory media) and communication media (or transitory media). The term "computer storage media" includes volatile and nonvolatile, removable and non-removable media implemented in any method or technology for storage of information such as computer readable instructions, data structures, program modules or other data, as is well known to one of ordinary skill in the art. The computer storage media include, but are not limited to, RAM, ROM, EEPROM, flash memory or other memory technology, CD-ROM, Digital Versatile Disks (DVD) or other optical disk storage, magnetic cassettes, magnetic tape, magnetic disk storage or other magnetic storage, or any other media which may be used to store the desired information and which may accessed by a computer. In addition, the communication media typically include computer readable instructions, data structures, program modules or other data in a modulated data signal such as a carrier wave or other transport mechanism, and include any information delivery media, as is well known to one of ordinary skill in the art.

Example embodiments have been disclosed herein. Specific terms are employed, but the specific terms are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one of ordinary skill in the art. It will therefore be understood by one of ordinary skill in the art that various changes in form and details may be made therein without departing from the scope of the present application as set forth in the appended claims.

What is claimed is:

1. A resource scheduling method, comprising:
selecting an optimal path from a pre-constructed resource label forest according to a weight of a path in at least one resource label tree in the resource label forest, wherein the resource label forest comprises the at least one resource label tree, and each path of the at least one resource label tree comprises a first node, a second node and a third node in an order from a root node to leaf nodes, wherein the first node is a node corresponding to a physical resource corresponding to a tenant, the second node is a node corresponding to a user belonging to the tenant, and the third node is a node corresponding to a virtual resource which is deployed on the physical resource and managed by the user;
scheduling a task to the third node through which the optimal path passes;
migrating a target user and a virtual resource managed by the target user on a physical resource corresponding to a first node, of a path in the resource label forest, with at least one of CPU utilization, memory utilization and storage utilization associated with a weight of the first node greater than a preset threshold to a physical resource corresponding to a first node, of another path in the resource label forest, with minimum weight, wherein the target user is a user with a maximum weight or a user with a second maximum weight; and
reconstructing the resource label forest according to a relationship among the migrated tenants, the physical resources, the users and the virtual resources,
wherein selecting the optimal path from the pre-constructed resource label forest according to the weight of the path in the at least one resource label tree in the resource label forest comprises:
traversing each path in each resource label tree in the resource label forest; and
selecting a path with minimum weight as the optimal path, wherein the weight of the path is determined according to a resource utilization of a node through which the path passes.

2. The method of claim 1, wherein the weight of the path is determined according to weights of the first node and the third node through which the path passes.

3. The method of claim 2, wherein
the weight of the first node is determined according to a CPU utilization, a memory utilization, and a storage utilization of the first node within a specified time period; and
the weight of the third node is determined according to a CPU utilization, a memory utilization and a storage utilization of the third node in the specified time period.

4. The method of claim 1, wherein a weight of the user is determined according to a weight of the node corresponding to the virtual resource managed by the user.

5. The method of claim 1, further comprising:
before a virtual resource with a tide characteristic generates a tide phenomenon, cloning a virtual resource which is the same as the virtual resource with the tide characteristic on a physical resource where the virtual resource with the tide characteristic is located, wherein a communication address of the cloned virtual resource is different from that of the virtual resource with the tide characteristic, and the cloned virtual resource and the virtual resource with the tide characteristic share a task; and
reclaiming the cloned virtual resource after the tide phenomenon in the virtual resource with the tide characteristic ends.

6. The method of claim 1, wherein before selecting the optimal path from the pre-constructed resource label forest according to the weight of the path in the at least one resource label tree in the resource label forest, the method further comprises:
constructing the resource label forest according to a relationship among the tenants, the physical resources, the users and the virtual resources; and
assigning corresponding weights to each first node and each third node in each resource label tree in the resource label forest, respectively.

7. An electronic device, comprising:
at least one processor; and
a memory having at least one program stored thereon, wherein the at least one program, when executed by the at least one processor, causes the at least one processor to implement the resource scheduling method of claim 1.

8. A non-transitory computer readable storage medium, having a computer program stored thereon, wherein the computer program, when executed by a processor, causes the processor to implement the resource scheduling method of claim 1.

* * * * *